C. T. WOODRUFF.
FLOOR SCRAPING MACHINE.
APPLICATION FILED OCT. 14, 1911.
1,021,497.
Patented Mar. 26, 1912.
4 SHEETS—SHEET 1.
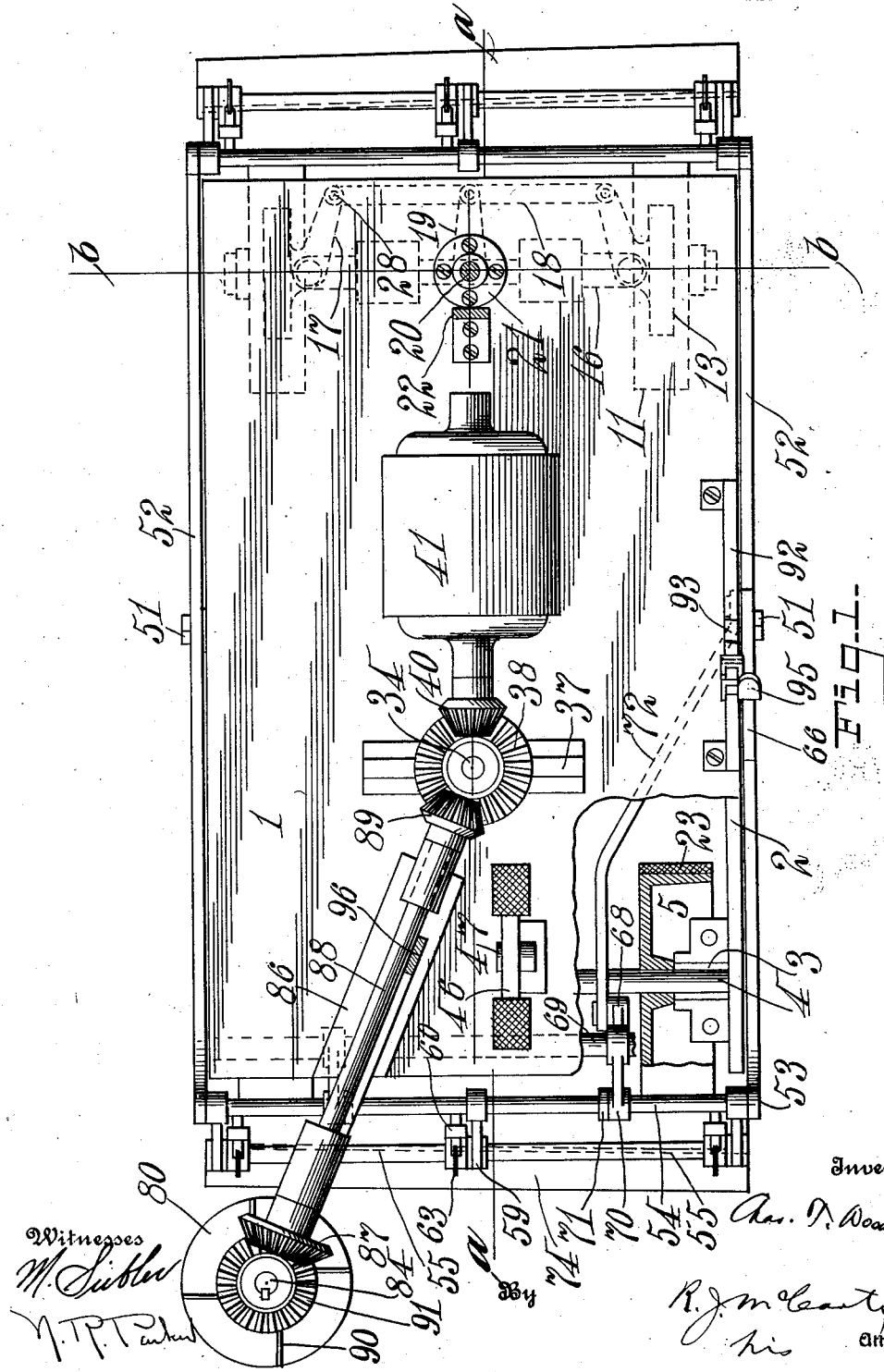

C. T. WOODRUFF.
FLOOR SCRAPING MACHINE.
APPLICATION FILED OCT. 14, 1911.
1,021,497.
Patented Mar. 26, 1912.
4 SHEETS—SHEET 2.
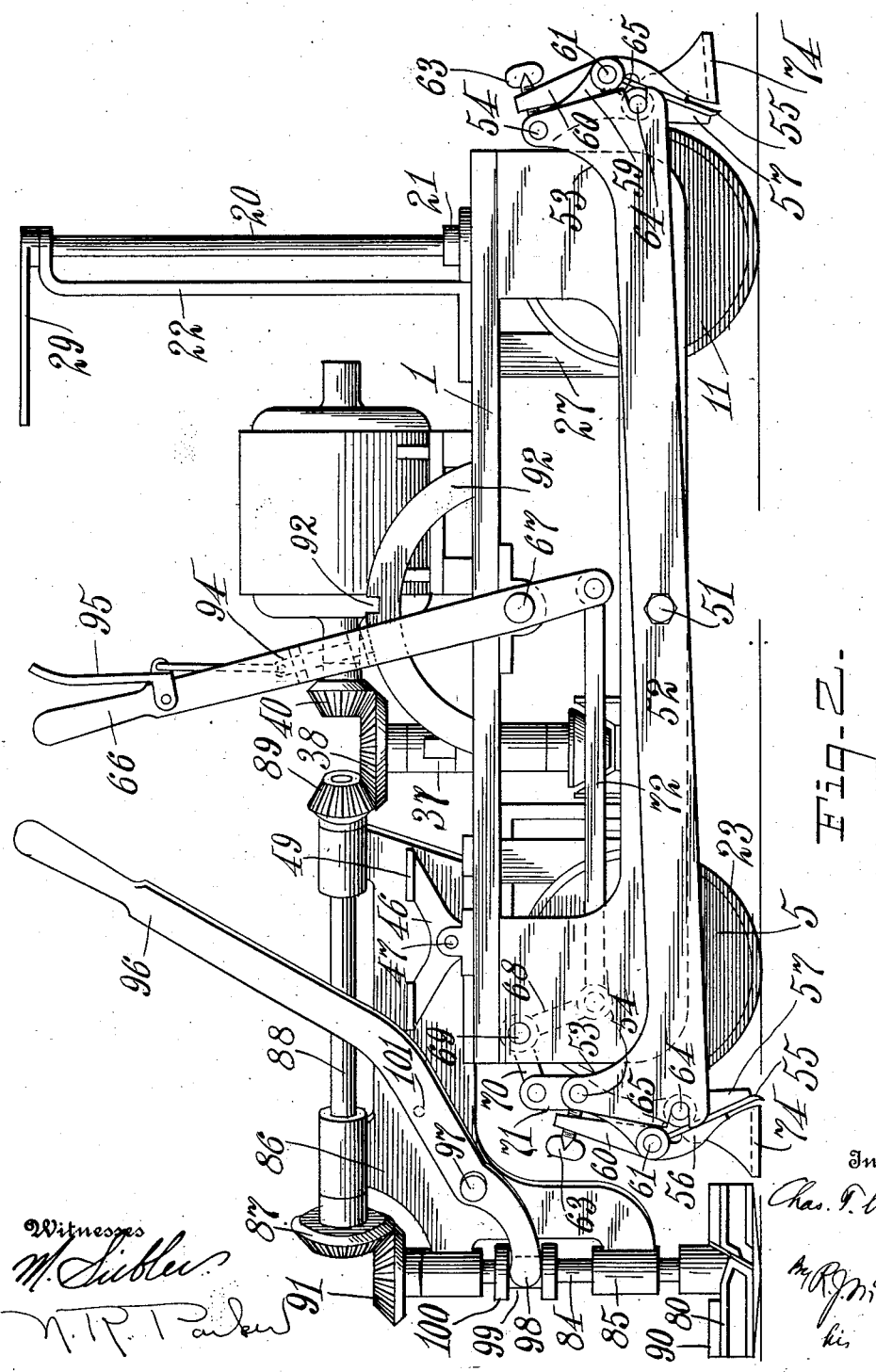

C. T. WOODRUFF.
FLOOR SCRAPING MACHINE.
APPLICATION FILED OCT. 14, 1911.
1,021,497.
Patented Mar. 26, 1912.
4 SHEETS—SHEET 3.
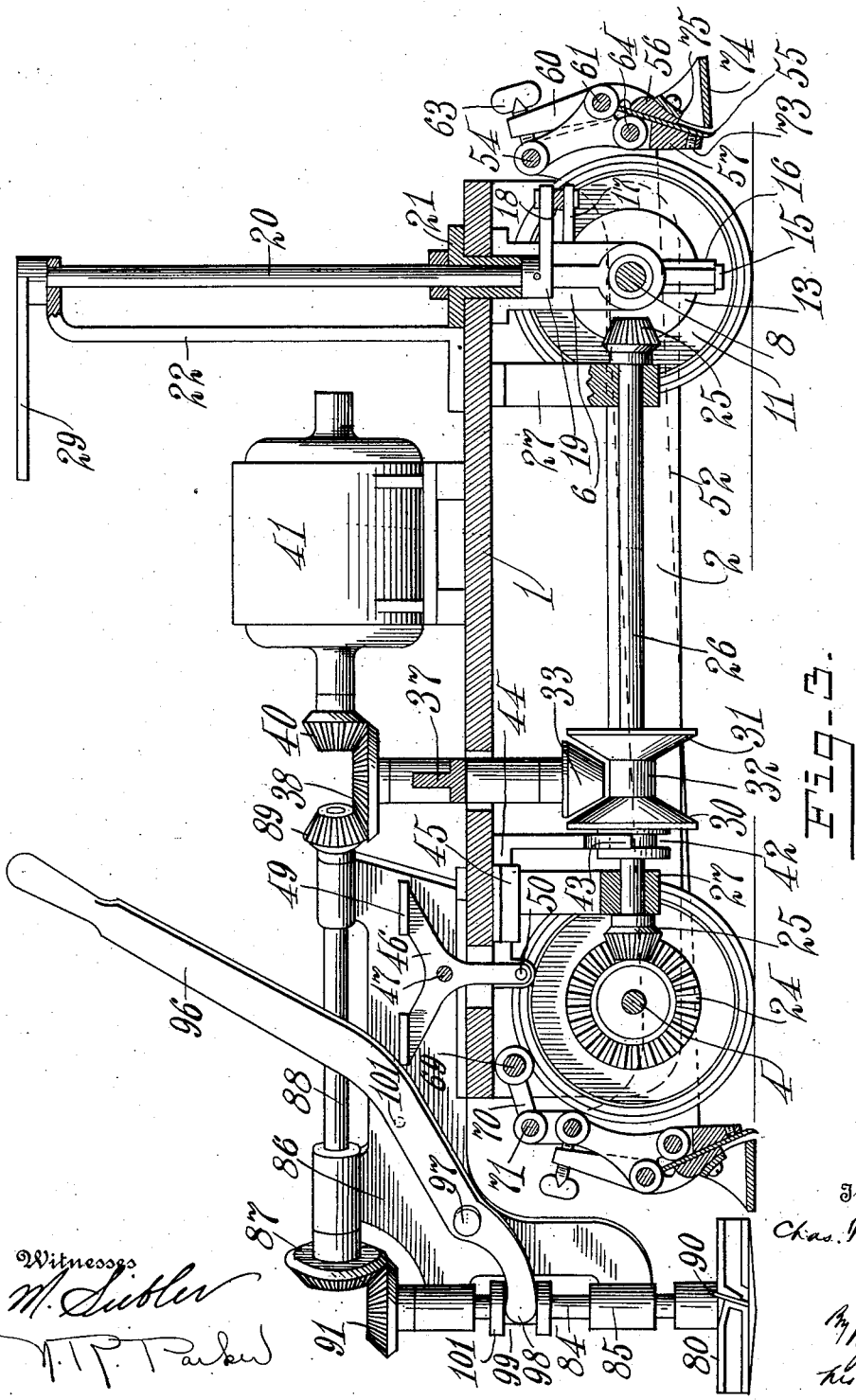

C. T. WOODRUFF.
FLOOR SCRAPING MACHINE.
APPLICATION FILED OCT. 14, 1911.
1,021,497.
Patented Mar. 26, 1912.
4 SHEETS—SHEET 4.
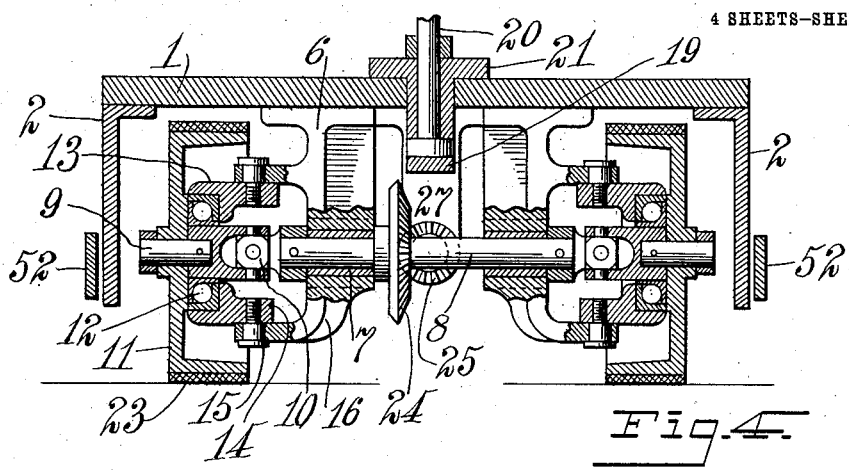
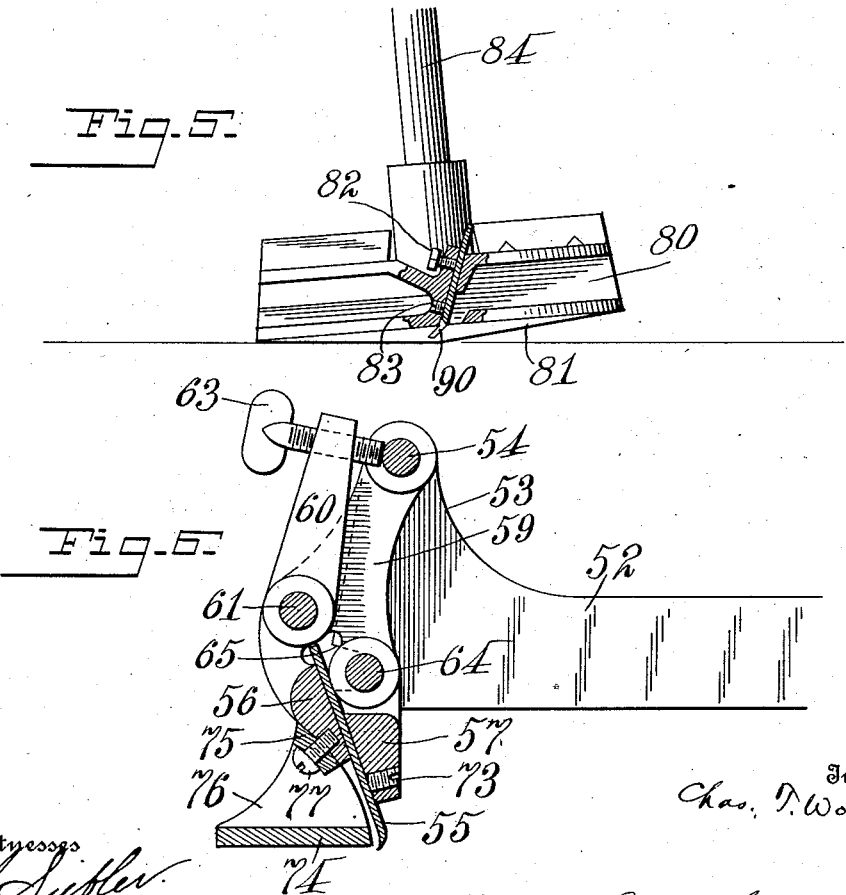

UNITED STATES PATENT OFFICE.

CHARLES T. WOODRUFF, OF URBANA, OHIO.

FLOOR-SCRAPING MACHINE.

1,021,497. Specification of Letters Patent. Patented Mar. 26, 1912.

Application filed October 14, 1911. Serial No. 654,572.

*To all whom it may concern:*

Be it known that I, CHARLES T. WOODRUFF, citizen of the United States, residing at Urbana, in the county of Champaign and State of Ohio, have invented certain new and useful Improvements in Floor-Scraping Machines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in power driven floor-scraping machines.

The object of the invention is to provide a machine for scraping or surfacing floors that is simple in construction and efficient in operation.

To the above ends the machine is specially adapted to give the floor a smooth surface and to finish the floor adjacent to the base board, as will be fully described in the specification and particularly pointed out in the claims.

Referring to the accompanying drawings, Figure 1 is a top plan view of the machine with parts broken away. Fig. 2 is a side elevation of the same; Fig. 3 is a section on the line *a—a* of Fig. 1; Fig. 4 is a section on the line *b—b* of Fig. 1; Fig. 5 is a detail view of the rotating cutting head, and Fig. 6 is a detail sectional view of one of the scrapers.

Referring more particularly to the drawings, 1 represents a deck place provided with side members 2. The side members 2 are provided with bearings 3 which receive the axle 4 of wheels 5. The deck 1 is also provided with downward extending members 6 provided with journals 7 which receive a shaft 8. The ends of the shaft 8 are connected to stub shafts 9 by universal joints 10. Mounted on the stub shafts 9 are wheels 11 provided with ball bearings 12. The bearings 12 are mounted in cups 13 provided with extensions 14 which are pivoted at 15 to brackets 16 extending from the downward extending members 6. The wheels 11 are steering wheels and are rocked on the pivots 15 by the following means. Projecting from the upper extensions 14 are arms 17 pivotally connected at 28 to a link or rod 18. See Fig. 1. The link 18 is pivotally connected to a crank 19 mounted on the lower end of a vertical rock shaft 20. The lower end of the shaft 20 is journaled in a bearing 21 mounted on the deck 1, while the upper end is journaled in a bracket 22 extending from the upper side of the deck. The upper end of the said shaft 20 is provided with a crank handle 29, by means of which the shaft 20 and the wheels 11 are rocked. All of the wheels 5 and 11, are driving wheels and are provided with rubber tires 23. The shafts 4 and 8 are rotated to drive the wheels by the following means. The said shafts are provided with bevel gears 24 engaged by gears 25 mounted on the ends of a shaft 26 journaled in bearings 27 extending from the under side of the deck 1. The gears 24 are mounted on opposite sides of the gears 25 and the shaft 26. The shafts 4 and 8 therefore rotate in the same direction. Mounted on the shaft 26 are left and right friction cones 30 and 31 mounted on a sleeve 32 splined to the shaft 26. Adapted to be engaged by the friction cones 30 and 31 is a cone 33 mounted on the lower end of a vertical shaft 34 journaled in a bearing 37 and provided with a bevel gear 38 on its upper end. The gear 38 is in mesh with a gear 40 mounted on the end of the shaft of an electric motor 41 mounted on the deck 1. By means of the motor 41 the cone 33 is driven in one direction and the wheels 5 and 11 in opposite directions by shifting the sleeve 32 and the cones 30 and 31. The sleeve 32 is provided with a groove 42 which receives the end 43 of a sliding member 44. This member 44 is mounted in bearings 45 on the under side of the deck 1, and one end thereof is connected at 50 to a lever 46 pivoted at 47. The upper end of the lever 46 is provided with two foot members 48 and 49. When the foot member 48 is depressed the cone 30 will be placed in engagement with the cone 33 and the machine will be driven in one direction, and when the other foot member 49 is depressed, the cone 31 will be placed in engagement with the cone 33, and the machine will be driven in the other direction.

Pivoted to the side members 2 at 51 are rocking side members 52 the ends of which are provided with upward extensions 53 connected by rods 54. Pivotally mounted on the rods 54 are frames which carry the scraping blades 55 and which are constructed as follows: The blades 55 are clamped between cross-members 56 and 57. The cross-members are provided with upward extensions 59, which are pivoted to the rods 54 and which permit the frames to be swung upward and the blades to be easily removed. The cross-members 57 are provided with extensions 60 pivoted at 61 to the extensions 59. The upper ends of the extensions 60 are provided with thumb screws 63 which engage the rods 54 and by means of which the blades 55 are clamped between the members 56 and 57. The extensions 59 are provided with a cross rod 64 the ends of which normally rest in recesses 65 in the ends of the rocking side members 52. When the machine is traveling to the left, as seen in Fig. 2, the left scraping blade 55 is depressed and is in engagement with the floor, but when the machine is traveling to the right, the right scraping blade is in contact with the floor. The rocking side members 52 are actuated to place either of the blades in contact with the floor, by a lever 66 pivoted at 67 to the deck. The lower end of the lever 66 is attached to a link 72 which in turn is attached to a crank 68 mounted on a rock shaft 69 journaled in the side members 2. The shaft 69 is provided with cranks 70 which are connected to one of the rods 54 by links 71. When the lever 66 is shifted, the side frames 52 will be rocked, and the position of the lever 66 determines the blade which is in contact with the floor. The scraping blades 55 may be held in a normal position when both blades are out of engagement with the floor, by a segment 92 provided with a recess 93 adapted to receive a sliding bolt 94 mounted on the lever 66 and controlled by a pivotal finger member 95. The angle at which the scraping blades 55 engage the floor is selected by screws 73 mounted in the cross-members 57. To prevent the scraping blades chattering, there is mounted in front of said blades, plates 74 which are connected to a cross-member 75 by upward extensions 76. The cross-member 75 is attached to the cross-member 57 by screws 77 which prevent the plates 74 being removed. The plates 74 engage the high places in the floor and guide the scraping blades in a true horizontal line, thereby preventing said blades chattering, and producing a smooth surface to the floor. The blades are placed longitudinally at a slight angle as is shown by the dotted lines, in Fig. 1, which prevents said blades becoming caught in the cracks in the floor.

To effectually smooth the surface of the floor close to the base boards, a rotating cutter head 80 is provided. This is mounted on the deck plate 1 and is driven from the motor 41. This cutter head 80 is shown in detail in Fig. 5 and is provided with a conical face 81 on its lower side. Mounted within the head 80 is a plurality of scraping blades 90 held therein by means of cap screws 82 and the scraping angle of which is adjusted by screws 83. The said head 80 is mounted on the lower end of a shaft 84 journaled in bearings 85 attached to a bracket 86 extending from the deck plate 1. The upper end of the shaft 84 is splined to a bevel gear 91 in mesh with a bevel gear 87 on one end of a shaft 88. Mounted on the other end of the shaft 88 is a bevel gear 89 in mesh with the gear 38 which is driven from the motor as before described. The shaft 84 is placed on an angle as is shown in Fig. 5, and as the face 81 is conical, the blades 90 will only engage the floor when traveling in one direction which insures a smoother finish. The bracket 86 is so placed on the deck 1 as to permit the periphery of the cutter head 80 to extend past the side of the machine, and which permits the scraping blades 90 of the cutter head to more effectually engage the floor near the base boards. The cutter head 80 may be elevated and lowered and pressed against the floor, by a lever 96 pivoted at 97 to the bracket 86. The lower end 98 of the lever 96 rides in a race 99 on a spool 100 mounted on the shaft 84. The cutter head may be held in an elevated position by a pin (not shown), but which may be inserted in a recess 101 in the bracket 86 and in the path of the lever 96.

Without limiting myself to the precise arrangement shown and described, which may be varied within the scope of the claims, I claim:

1. In a machine of the type specified, the combination with a frame-work, and a longitudinal bar mounted on each side of said framework and pivoted at its center to said frame-work, of clamping frames mounted on the ends of said bars, scraping blades mounted in said clamping frames, and a lever connected to said bars to rock the same on their pivots, whereby only one of said scraping blades may be in engagement with the floor at a time.

2. In a machine of the type specified, the combination with a frame-work, and longitudinal bars pivoted at their centers to said frame-work, of clamping frames pivotally mounted on the ends of said bars, scraping blades mounted in said clamping frames, said clamping frames being adapted to be swung upwardly to permit the removal of said blades, and means for rocking said bars on their pivots to permit one or the other of said blades to engage the floor.

3. In a machine of the type specified; the combination with a frame work; of longitudinal bars pivoted to said frame work; of a clamping frame pivotally mounted on said bars; a scraping blade mounted in said clamping frame, said clamping frame being adapted to be swung upwardly to permit of the removal of the blade; and means for rocking said bars on their pivots to permit the scraping blade to engage and disengage the floor.

4. In a machine of the type specified; the combination with a frame work; of longitudinal bars pivoted at their centers to said frame work; of clamping frames pivotally mounted on the ends of said bars; a scraping blade mounted in each clamping frame; a plate mounted on each clamping frame in front of the blades and adapted to engage the floor to guide the blades; and means for rocking said bars.

5. In a machine of the type specified; the combination with a frame work; of longitudinal bars pivoted to said frame work; of a clamping frame pivotally mounted on said bars; a scraping blade mounted in said clamping frame, said clamping frame being adapted to be swung upwardly to permit of the removal of the blade; a plate mounted on said clamping frame in front of the blade and adapted to engage the floor to guide the blade; and means for rocking said bars.

In testimony whereof I affix my signature, in presence of two witnesses.

CHARLES T. WOODRUFF.

Witnesses:
R. J. McCarty,
Matthew Seibler.

Copies of this patent may be obtained for five cents each, by addressing the "Commissioner of Patents, Washington, D. C."